Figure 1:
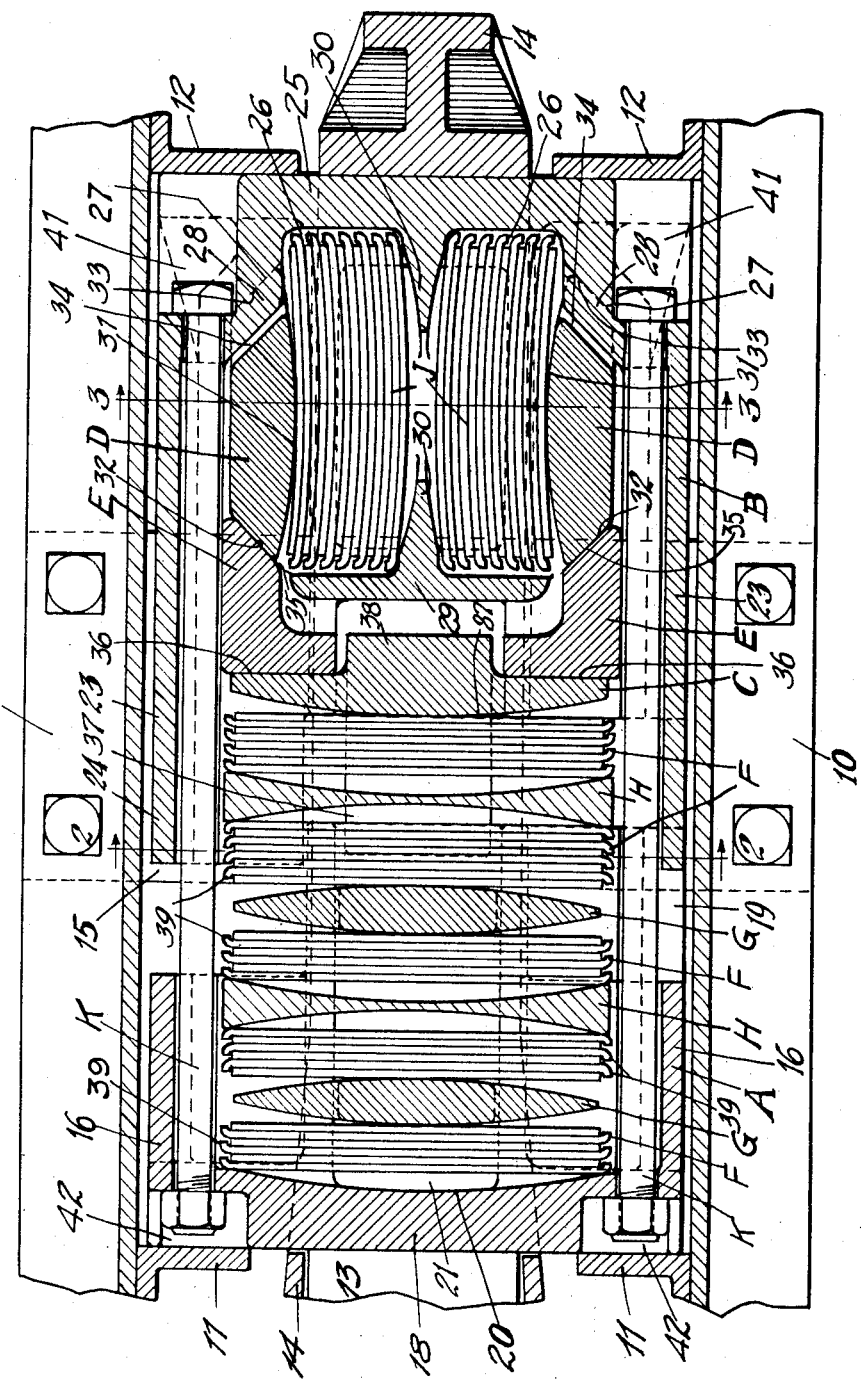

Aug. 30, 1932.  S. B. HASELTINE  1,874,288
SHOCK ABSORBING MECHANISM
Filed Sept. 15, 1928  2 Sheets-Sheet 2
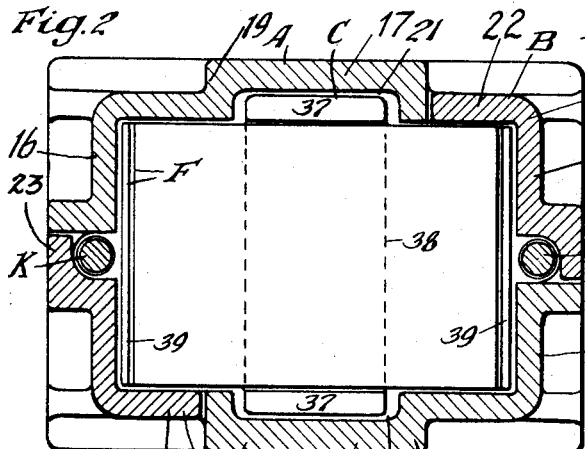
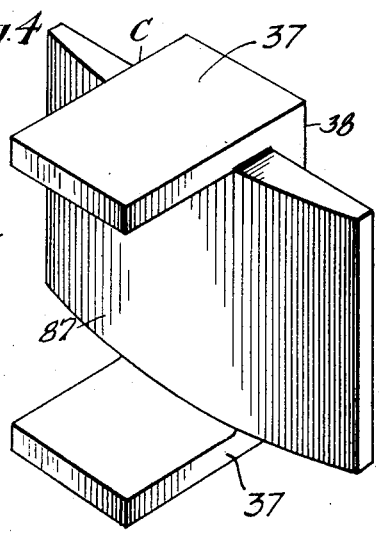
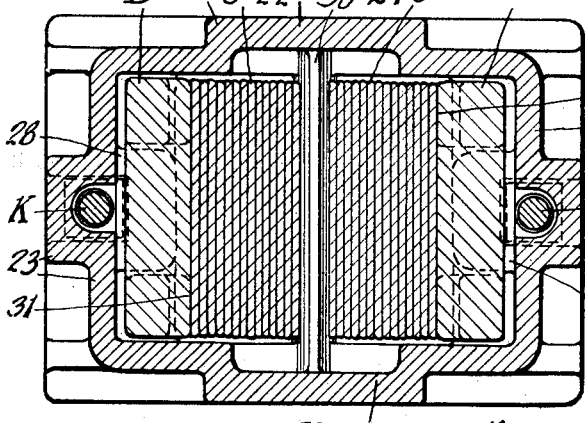
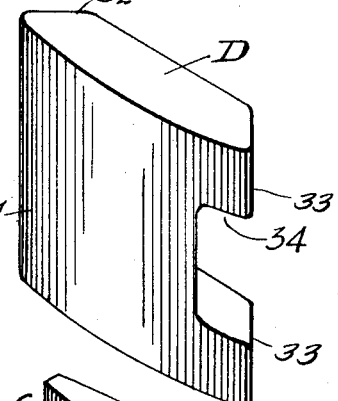
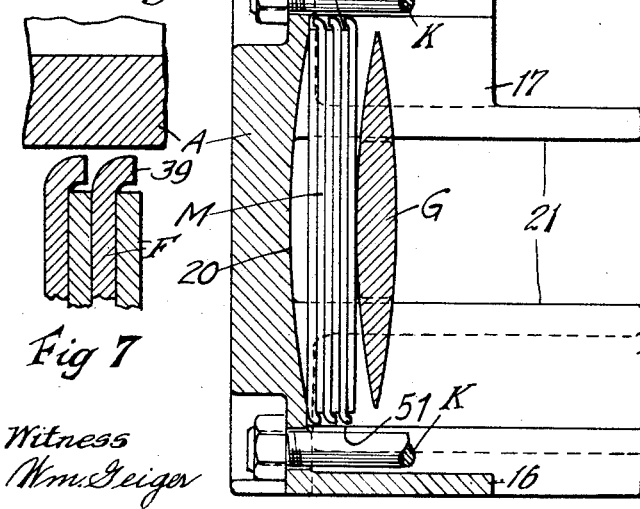
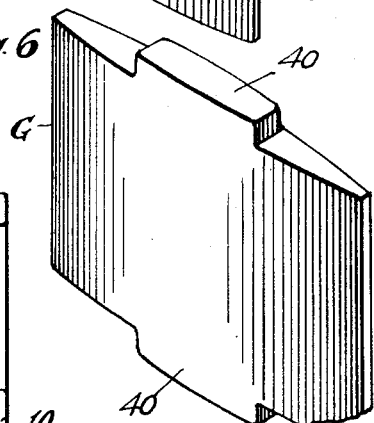
Inventor
Stacy B. Haseltine
By Joseph Harris
His Atty.
Witness
Wm. Geiger Patented Aug. 30, 1932

1,874,288

UNITED STATES PATENT OFFICE

STACY B. HASELTINE, OF CHICAGO, ILLINOIS, ASSIGNOR TO W. H. MINER, INC., OF CHICAGO, ILLINOIS, A CORPORATION OF DELAWARE

SHOCK ABSORBING MECHANISM

Application filed September 15, 1928. Serial No. 306,206.

This invention relates to improvements in shock absorbing mechanisms.

One object of the invention is to provide a shock absorbing mechanism especially adapted for railway draft riggings, of rugged design and high capacity, including main followers relatively movable toward and away from each other and a main spring resistance and friction means interposed between the followers and actuated upon relative approach of the same, the friction means including a laminated plate spring compressible between side members, wedged inwardly upon relative movement of the followers by wedge means movable with one of the followers, and additional movable wedge means yieldingly resisted by said main spring, wherein friction is created between the members of the laminated plate spring due to slippage of the plates thereof on each other; on the bearing faces of the side members during flexing of the same; and on the wedge faces.

Another object of the invention is to provide a shock absorbing mechanism of the character indicated, including relatively movable follower casings and a main spring resistance comprising a plurality of laminated plate spring units separated by spacing members, wherein certain of the spacing members are held out of contact with the side walls of the casings to prevent damaging the latter, said spacing members and one of the follower casings being provided with cooperating guide means limiting movement of the spacing members to a direction lengthwise of the casings.

Yet another object of the invention is to provide a shock absorbing mechanism, including relatively movable follower casings and shock absorbing means including laminated plate spring resistance means interposed between the follower casings and enclosed thereby, wherein the casings are provided with interengaging extended portions to prevent lateral displacement of the casings and in addition support the members of the plate springs when the follower casings are moved apart.

A still further object of the invention is to provide a laminated plate spring unit for shock absorbing mechanisms, including a spring container, composed of a plurality of plate spring members arranged in pairs, the plates at each of the opposite end portions of said pairs having respectively a raw end edge and a rounded bent end edge, the rounded bent end edge overhanging the raw end edge to shield the spring container, and further presenting a smooth end bearing face for said pairs of plate members to prevent damage to the container walls upon contact therewith.

A further object of the invention is to provide a laminated plate spring unit for shock absorbing mechanisms, composed of a plurality of plate members arranged in pairs, one plate of each pair having raw end edges at opposite ends and the other member of each pair being provided with a bent end portion overhanging said raw end edge of the first named member to house the same and provide shielding means for said raw end edge.

A more specific object of the invention is to provide a shock absorbing mechanism including relatively movable follower casings; a spring follower; a main spring resistance composed of a plurality of laminated plate spring units interposed between the spring follower and one of said follower casings; laterally inwardly acting pressure transmitting members disposed at opposite sides of the mechanism interposed between the spring follower and the other casing; wedge means movable with said last named casing and spring follower, respectively, for wedging said side members laterally inwardly; and laminated plate spring means interposed between said side members, comprising two units, each composed of a plurality of longitudinally arranged spring plates, the units being separated by spacing means presenting concave bearing surfaces for said plate springs and the side members having convex surfaces bearing on the same.

Other and further objects of the invention will more clearly appear from the description and claims hereinafter following.

In the drawings, forming a part of this specification, Figure 1 is a horizontal longitudinal sectional view of a portion of a railway draft rigging, illustrating my improvements in connection therewith. Figures 2 and 3 are transverse vertical sectional views, corresponding respectively to the lines 2—2 and 3—3 of Figure 1. Figures 4, 5 and 6 are detailed perspective views respectively of the spring follower, a side member and a spacing member employed in connection with my improved mechanism. Figure 7 is an enlarged, broken, horizontal sectional view of the front follower casing, showing the laminated plate spring members in plan. And Figure 8 is a horizontal sectional view of the front follower, illustrating a different embodiment of the invention.

In said drawings, referring first to the embodiment of the invention illustrated in Figures 1 to 7, inclusive, 10—10 indicate channel-shaped center or draft sills of a railway car underframe, to the inner sides of which are secured front stop lugs 11—11 and rear stop lugs 12—12. The inner end portion of the coupler shank is designated by 13, to which is operatively connected a hooded yoke 14 of well known form. My improved shock absorbing mechanism is supported by the yoke, and the yoke in turn is supported by a saddle plate 15 detachably secured to the draft sills.

My improved shock absorbing mechanism proper comprises, broadly, front and rear follower casings A and B; a spring follower C; two side members D—D; two wedge blocks E—E; a main spring resistance composed of a plurality of laminated plate spring units F—F; a plurality of spacing members G and H; two longitudinally arranged laminated spring units J—J, cooperating with side members; and a pair of retainer bolts K—K.

The front follower casing is in the form of a hollow box-like member, having longitudinally disposed spaced side walls 16—16, horizontal spaced top and bottom walls 17—17, and a transverse front end wall 18, which cooperates directly with the front stop lugs 11 in the manner of the usual front follower. As shown, the top and side walls are cut away at the inner end of the casing to present rearwardly extending arms 19—19, each arm being of angular transverse section and comprising a portion of the horizontal wall and a section of the adjacent side wall extending at right angles thereto, as most clearly shown in Figure 2.

The front wall 18 of the casing is relatively thick, as shown, and is provided with a transversely extending concave bearing face 20 on the inner side thereof, which cooperates with the adjacent laminated plate spring F. The top and bottom walls 17 of the casing are provided with centrally extending, longitudinally disposed, interior channels 21—21, for a purpose hereinafter described.

The rear follower casing B is also in the form of a substantially rectangular box-like member and is provided with longitudinally extending spaced top and bottom walls 22—22 and vertically extending spaced side walls 23—23. The walls are cut away at the forward end to provide forwardly projecting arms 24—24 at diagonally opposite corners of the casing, each composed of a portion of the vertical side wall and the adjacent horizontal wall. The arms 24 overlap the arms 19 of the casing A, the casings being thus guided for longitudinal relative movement. A transverse end wall 25 closes the rear end portion of the follower B, the wall 25 cooperating with the stop lugs 12 in the manner of the usual rear follower. On the inner side, the wall 25 is recessed, as indicated at 26—26, for a purpose hereinafter pointed out. At the rear end of the casing B, the side walls are thicker than the main portions of the same, thereby presenting offset sections provided with wedge faces 27—27. As most clearly shown in Figure 1, the wedge faces 27 have central guide tongues 28 projecting therefrom. At the central portion, the casing B is provided with a transverse vertically disposed web 29 connecting the top and bottom walls thereof and having its opposite side edges spaced from the side walls, as clearly illustrated in Figure 1.

Short spacing wall sections 30—30 are provided centrally of the casing B, one of the wall sections extending rearwardly from the web 29 and the other section extending forwardly from the end wall 25. As shown, the inner ends of the walls 30 are spaced apart an appreciable distance and the side faces of said walls are curved to provide concave bearing faces.

The side members D are disposed at opposite sides of the casing B and cooperate with the wedge faces 27 of said casing. Each member D is provided with a curved bearing face 31 on the inner side thereof, the bearing face being preferably convex. At the forward end, each side member D is provided with a wedge face 32 adapted to cooperate with one of the wedge blocks E. At the rear end, each block is provided with a wedge face 33 cooperating with the wedge face 27 of the casing B. As most clearly illustrated in Figure 5, the rear end portion of each side member D is centrally cut away, as indicated at 34, to accommodate the projecting tongue 28 with suitable clearance therebetween.

The wedge blocks E are two in number and are disposed at opposite sides of the casing B and cooperate with the side members D. Each wedge block E is provided with a wedge face 35 at the inner end thereof, cooperating with the wedge face 32 of the corresponding side member. At the front end, each wedge block E presents a flat transverse face 36 which engages directly with the spring follower C. The spring follower C is in the form of a substantially rectangular plate having horizontally disposed, forwardly extending top and bottom arms 37—37, adapted to work in the guide channels 21—21 of the top and bottom walls of the casing A and also overhanging several of the plate spring members and nearest spacer H to hold the same assembled within the casings, as hereinafter pointed out. The follower C is provided with a transversely disposed, convex bearing surface 87 on the front side thereof, directly engaging the adjacent spring unit F. At the rear side, the follower is provided with a centrally disposed vertical enlargement 38 which is adapted to engage the web 29 and thus prevent the springs J from going solid.

The main spring resistance comprises a plurality of laminated spring units F—F, which are separated by spacing members G and H. As shown in the present instance, three of the units comprise six spring plates, while the remaining two units are composed of eight spring plates. The spring plates of each unit are arranged in pairs, each pair comprising a substantially rectangular plate having straight raw end edges at the opposite sides thereof and a second rectangular spring plate having the opposite end sections thereof bent over, as indicated at 39, to overhang the adjacent raw edges of the other plate. The plate of the pair having the raw end edges is thus nested within the other plate and embraced at opposite end edges by the bent end edges of the latter. In this connection, it is pointed out that the bent overhanging end edges 39 prevent lateral displacement of the plates of each pair with respect to each other, and also prevent engagement of the raw end edges with the side walls of the casing A. In addition, the bent end sections 39 present smooth bearing faces which will not cause injury to the side walls of the casing A upon coming in contact therewith. The spring plates, in actual practice, will be initially bent somewhat in the opposite direction in which intended to be flexed during compression and placed in the gear under initial compression.

The five units of the laminated plate spring resistance are held apart by the spacing members G and H, as hereinbefore stated. The spacing members G are each provided with convex bearing surfaces on the opposite sides thereof and the spacing members H, which are alternated with the spacing members G, are provided with concave bearing surfaces on their opposite sides. Each of the spacing members G and H is provided with top and bottom central lugs 40—40, which engage within the channels 21—21 of the top and bottom walls of the casing A and are guided for longitudinal movement thereby. As will be evident, the spacing members G and H and the spring follower C are thus held against lateral displacement with respect to the casings A and B by the guide means thereof which cooperates with the guide channels 21.

The two laminated spring units J—J, which cooperate with the side members D, are of a design similar to the laminated plate spring units F, hereinbefore described. Each of the units J, as shown in the present instance, is composed of fourteen plate springs, the plate springs of each unit being arranged in pairs, one member of which is provided with bent over end edge sections at the opposite edges thereof, overhanging the raw end edges of the next adjacent plate. As shown, the spring units J are interposed between the side members and the walls 30 and are under a predetermined initial compression to hold the same slightly flexed, as shown in Figure 1. The front end portions of the plate springs of each unit J are disposed within the recess 26 at the corresponding side of the casing B. Longitudinal displacement of the members of each unit is prevented by engagement of the end wall 25 of the casing B and the web 29.

The mechanism is held assembled and of overall uniform length by a pair of retainer bolts disposed at opposite sides of the casings A and B. The retainer bolts have the heads thereof disposed in cut-away sections 41—41 of the side walls of the casing B and have the nuts thereof disposed within recesses 42—42 provided at opposite sides of the casing A.

The operation of my improved shock absorbing mechanism, during a draft or buffing action, is as follows: The follower casings A and B will be moved relatively toward each other, thereby flexing the laminated spring units F between the bearing faces on the follower casing A, the spacing members G and H, and the spring follower C. The actuating force will be transmitted through the spring follower to the wedge blocks E and a wedging action will be set up between the latter and the side members D, the side members D being wedged inwardly by the wedge faces on the wedge blocks E and the casing B. As the side members D are forced laterally inwardly toward each other, the laminated spring plate members J will be flexed between the convex bearing surfaces of the members D and the concave bearing surfaces of the wall sections 30.

The compression of the mechanism will continue either until the actuating force is reduced or the movement of the parts is limited by the ends of the housings engaging each other, the spring units F coming into full surface contact with the respective convex and concave faces of the spacers and followers, and the projection 38 of the follower C engaging the web 29.

When the actuating force is reduced, the tendency of the members of the laminated plate spring units to assume the normal position will return all of the parts to the full release position shown in Figure 1, outward movement of the casings A and B with respect to each other being limited by the retainer bolts K.

Referring next to the embodiment illustrated in Figure 8, the construction of all the parts, with the exception of the spring plates, is substantially the same as that hereinbefore described. The spring plates are shown in this instance as arranged within the casing A. The spring plates cooperate with the next adjacent spacing member G and the concave bearing surface 20 on the inner side of the wall of the casing A. The plate spring unit which is indicated by M, as shown, is composed of six spring plate members. The spring plate members are arranged in pairs, each pair comprising two similar plates, having a raw end edge 50 at one end thereof and a bent over end edge 51 at the opposite end. As shown, the plates of each pair are reversely arranged end for end, so that the bent over end edge of one plate overhangs the raw end edge of the other plate of said pair. As will be evident, the bent over end edges form shielding means for the raw end edges of the plates in a similar manner, as pointed out in connection with the laminated plate spring units F and J, hereinbefore described.

The operation of the device shown in Figure 8 is substantially the same as that shown in the other form of the invention hereinbefore described, the casing A cooperating with a casing similar to the casing B hereinbefore described, and containing shock absorbing means comprising longitudinally disposed laminated plate spring members and cooperating wedge means.

In this connection, it is pointed out that by the arrangement of interengaging arms on the casings A and B, the casings are not only guided for longitudinal movement, but the arms which overlap the gap between the inner ends of the casings, when the same are separated, also serve as effective supporting means for the laminated plate spring units, thereby preventing displacement of the same vertically and transversely with respect to the casings. The spring follower, by means of the arms 37 which embrace the adjacent plates of the laminated spring units F, also aid to hold the plates properly assembled, inasmuch as the arms extend over the gap between the casings when the same are separated.

The arrangement of laminated plate spring units, wherein the raw end edges of the plates are properly shielded, as is the case in connection with my improvements, greatly adds to the life of the mechanism and especially the casings thereof, inasmuch as damage to the side walls is substantially eliminated. The raw end edges of the plates are properly shielded by the bent over end portions of the adjacent plates, and the rounded end faces of the bent over portions are so designed that when the plates of each unit are flexed, there will be no digging in of the ends of the plates, because the end sections will swing in arcs of circles having a center of radius coinciding with the longitudinal axis of the mechanism. As will be evident, the end portions of the plates will thus draw away from the side walls of the casings immediately upon flexing of the plates.

While I have herein shown and described what I consider the preferred manner of carrying out my invention, the same is merely illustrative and I contemplate all changes and modifications which come within the scope of the claims appended hereto.

I claim:

1. In a shock absorbing mechanism, the combination with relatively movable follower members; of a laminated plate spring under initial compression, the members of said plate spring being disposed lengthwise of the mechanism; pressure transmitting members disposed at opposite sides of said laminated plate spring slidable lengthwise thereon; a main spring resistance yieldingly opposing longitudinal movement of said members; and means for wedging the said members inwardly to compress the laminated plate spring.

2. In a shock absorbing mechanism, the combination with relatively movable follower members; of a laminated plate spring, the members of said plate spring being disposed lengthwise of the mechanism; pressure transmitting members disposed at opposite sides of said laminated plate spring; means movable with one of said followers and having wedging engagement with said members at one set of ends thereof, said plate spring being movable with said last named follower and slidable on said pressure transmitting members; means having wedging engagement with the opposite ends of said members; and a main spring resistance interposed between said last named means and the other main follower.

3. In a shock absorbing mechanism, the combination with relatively movable follower casings; of a laminated plate spring within one of said casings, the members of said plate spring being disposed lengthwise of the mechanism; means for flexing said spring, including a pair of side members on opposite sides of said plate spring and movable laterally toward each other and slidable lengthwise on said plate springs; wedge means cooperating with the opposite ends of said side members for forcing the same laterally inwardly, the wedge means at one end of said members being movable with one of said follower casings; and a main spring resistance interposed between the wedge means at the other end of said members and the other follower casing.

4. In a shock absorbing mechanism, the combination with relatively movable follower casings; of a laminated plate spring within one of said casings, the members of said plate spring being disposed lengthwise of the mechanism, said casing having a transverse end wall and an abutment wall inwardly thereof, between which said plate spring is confined; means for flexing said spring, including a pair of side members on opposite sides of said plate spring, each of said members having wedging engagement at one end with said last named casing, said plate spring being movable with said last named casing and slidable relatively to said side members; wedge means engaging the other end of each member; and a main spring resistance opposing movement of said wedge means.

5. In a shock absorbing mechanism, the combination with relatively movable follower casings; of side members within one of said casings; spring means interposed between said side members; a main spring resistance, including a plurality of laminated plate spring units housed within said follower casings; spacing members separating said units; a spring follower; and guide means of cooperating guide and groove formation on one of said follower casings, spring follower and spacing members, to limit movement of the spring follower and spacing members to a direction lengthwise of the mechanism.

6. In a shock absorbing mechanism, the combination with relatively movable follower casings; of a main spring resistance; side members entirely within one of said casings; spring resistance means interposed between said side members; a spring follower within said last named casing and means for forcing said side members laterally inwardly toward each other, including wedge means movable with said spring follower.

7. In a shock absorbing mechanism, the combination with relatively movable follower casings, one of said casings having wedge means thereon; of a spring follower; a main spring resistance interposed between said spring follower and the other casing; wedge blocks engaged by said spring follower and having frictional engagement with the adjacent follower casing; wedge shoes disposed at opposite sides of the casing interposed between said wedge blocks and wedge means; two laminated plate spring units interposed between said wedge shoes; and spacing means for said units, said spacing means and shoes being provided with curved bearing surfaces cooperable with the spring units to flex the latter.

In witness that I claim the foregoing I have hereunto subscribed my name this 12th day of September, 1928.

STACY B. HASELTINE.